United States Patent [19]

Seetharaman et al.

[11] Patent Number: 5,667,285
[45] Date of Patent: Sep. 16, 1997

[54] CENTRAL HYDRAULICS BRAKE SYSTEM

[75] Inventors: Viswanath Seetharaman, Anderson; Dale Lee Baldauf, Pendleton, both of Ind.; Donald Edward Schenk, Vandalia, Ohio; William Vincent Jacob, Pittsburgh, Pa.

[73] Assignee: General Motors Corporation, Detroit, Mich.

[21] Appl. No.: 508,808

[22] Filed: Jul. 28, 1995

[51] Int. Cl.$^6$ .......................................... B60T 8/36
[52] U.S. Cl. ...................... 303/116.2; 303/119.1; 303/119.2; 303/117.1
[58] Field of Search ............ 303/113.2, 115.4, 303/116.2, 116.1, 117.1, 119.1, 119.2; 137/625.65; 251/129.08; 335/262

[56] References Cited

U.S. PATENT DOCUMENTS

| | | | |
|---|---|---|---|
| 5,112,114 | 5/1992 | Cogswell, II et al. | 303/113.2 |
| 5,221,126 | 6/1993 | Inoue | 303/117.1 X |
| 5,273,348 | 12/1993 | Yagi et al. | 303/119.2 X |
| 5,538,336 | 7/1996 | Reuter et al. | 303/119.2 |

*Primary Examiner*—Peter M. Poon
*Attorney, Agent, or Firm*—Jeffrey A. Sedlar

[57] ABSTRACT

A pressure control solenoid based vehicle braking system utilizes intensifiers to permit the hydraulic control components to operate at lower pressures. A method of selectively locking the intensifiers in position is provided. Unique pressure regulators provide predictable control of load pressure and are isolated in the system by a combination of enable valves and the locking method.

14 Claims, 5 Drawing Sheets

1

CENTRAL HYDRAULICS BRAKE SYSTEM

BACKGROUND OF THE INVENTION

The present invention relates to vehicle braking systems and more particularly, to pressure control solenoid based systems.

Technical drawbacks have generally inhibited the actual application of pressure control solenoid valves in vehicle braking systems. One drawback is the development of a dependable, cost-effective pressure control solenoid valve that provides predictable and repeatable control pressure as a function of an electrical input signal.

This drawback has been addressed in the development of the present braking system by a device claimed in related application, U.S. Ser. No. 08/402,216 filed Mar. 10, 1995 now U.S. Pat. No. 5,571,248, entitled Pressure Regulator, which is commonly assigned and specifically incorporated herein by reference.

Another drawback is that a typical pressure control solenoid valve generally has a valve structure that inherently leaks. A conventional method of reducing the leakage of the valve is to minimize clearances between the valve's moving member and housing. This requires tight tolerances and may require selected fitting of the moving member into each individual housing. The general conventional approach is effective in reducing leakage but does not totally eliminate it. This conventional approach also tends to be costly and temperature sensitive.

Another drawback of conventional pressure control solenoid valve's is that closely toleranced valve components tend to exhibit an inherently undesirable condition due to a phenomenon called limit cycling. With limit cycling in conventional hydraulic servo-type valves, a large increase in flow gain is exhibited as the device overcomes a positive overlap between the valve's moving member and housing.

SUMMARY OF THE INVENTION

The present invention provides a pressure control solenoid valve (pressure regulator) based vehicle braking system which utilizes pressurized hydraulic fluid that is produced by a conventional hydraulic system. The hydraulic system generally consists of a reservoir, a hydraulic pump, a control valve and an accumulator to provide a source and a reservoir of pressurized hydraulic fluid. The hydraulic pump is independently electric motor driven or combined in an integrated hydraulic system with the vehicle's power steering or other hydraulic systems.

To assist the pressure regulator in maintaining essentially zero leakage, the braking system according to the present invention implements an enable valve to conserve pressurized fluid and to maintain accumulator charge for default power assisted braking. The system utilizes hydraulic intensifiers which allow a substantial part of the hydraulic system to operate at lower pressure while providing the required higher pressure for system braking. This feature assists in lowering the overall braking system costs. The hydraulic intensifiers provide a natural fluid isolation between the low pressure side of the intensifier and the high pressure braking side, which provides for the use of two different fluids if desirable.

The braking system utilizes a pilot operated hydraulic lock valve to provide essentially zero leakage or a mechanical intensifier lock to lock the intensifiers. As a result, pedal fall away is prevented during manual braking and during selected system default modes.

Locking the intensifier also permits the utilization of pressure regulators with larger clearances and wider tolerances than otherwise possible. This helps hold down overall system costs.

The enable valve is preferably pilot operated. This preferred feature contributes to system affordability in addition to enabling the hydraulic braking system only when needed for power braking, anti-lock braking situations or traction control situations.

The braking system also preferably includes an enable solenoid valve that provides electrical control of the enable valve and the pilot operated hydraulic lock valves simultaneously.

The high energy density of the present central hydraulics brake system provides advantages which allows the system to be used on large vehicle applications. Additionally, this solenoid based system generally requires less electrical power which preferably lowers the cost of the electrical driver circuits.

The present system is adaptable to providing power braking, ABS and traction control functions.

DETAIL DESCRIPTION OF THE PRESENTLY PREFERRED EMBODIMENTS

Figure 1:
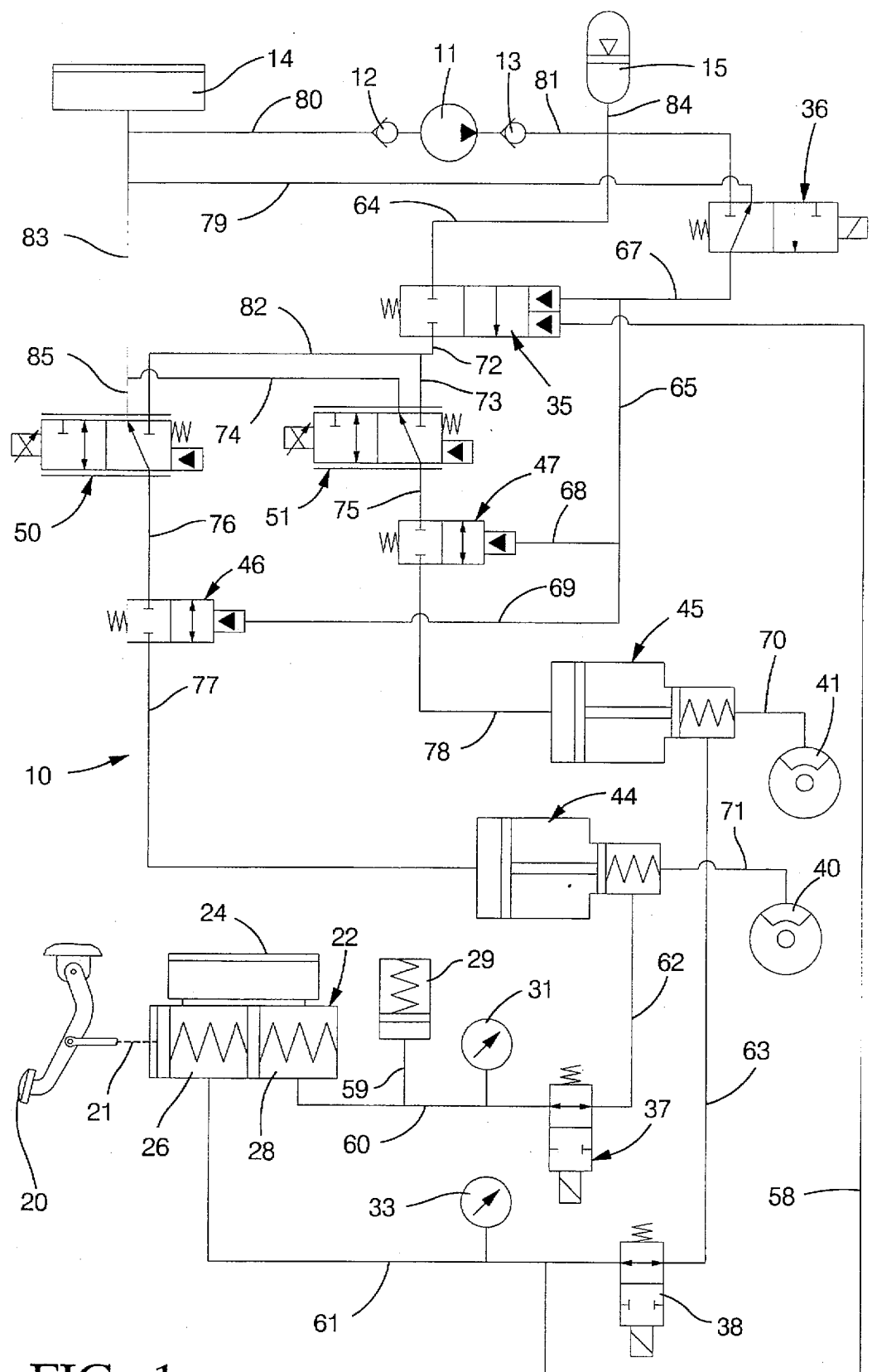
FIG. 1 is a graphic symbol fluid hydraulic diagram for a brake system according to the present invention.

Referring to FIG. 1, a graphic symbol hydraulic diagram illustrates a brake system 10 using pressure regulators 50 and 51 to control the brake line pressure independently to each wheel brake 40 and 41. The system, as will be described, includes two independent braking channels which provide independent brake control for each wheel brake 40 and 41. The brake system 10 is adaptable to utilizing a similar additional channel (not illustrated), to provide braking control for two additional wheels such as the vehicle's rear wheels. The brake system 10 is also adaptable to a four channel system to provide independent control over each of the four vehicle wheels.

Brake system 10 is capable of operating with brake fluid as the only working fluid or with brake fluid utilized on the high pressure side of intensifiers 44 and 45 and hydraulic fluid utilized on the low pressure side of intensifiers 44 and 45.

Brake system 10 includes a default mode for base brake system operation by a conventional dual piston master cylinder 22. Master cylinder 22 provides for the separate pressurization of two braking channels through pressure chambers 26 and 28. Fluid reservoir 24 supplies fluid to master cylinder 22. Through the cooperation of master cylinder 22 with brake pedal actuator 20 by means of link 21, a selectively applied means for manual actuation is provided for the brake system 10.

Brake system 10 includes pump 11 which is driven by the vehicle's engine (not illustrated) or by an optional electric motor (not illustrated). Pump 11 is provided with a supply of fluid through conductor 80 from reservoir 14 and through return from the rest of system 10 by means of conductor 83. Conductor 80 includes check 12 to prevent reverse flow therethrough.

Output from pump 11 flows through check valve 13 and conductor 81 which is in fluid communication with conductor 84 and therethrough, with accumulator 15. Pump 11 is provided with a conventional means (not illustrated) of maintaining a predetermined pressure level in accumulator 15.

Conductor 81 is also in fluid communication with a port of enable solenoid valve 36. Enable solenoid valve 36 includes three flow ports and provides simultaneous electrically responsive control of pilot pressure to enable valve 35, lock valve 46 and lock valve 47. When energized, enable solenoid valve 36 permits fluid communication between conductor 81 and conductor 65.

Conductor 65 is in fluid communication with conductor 67, which provides pilot pressure operable to shift the normally closed enable valve 35 to an open condition. Conductor 65 is also in fluid communication with conductor 68 which provides pilot pressure operable to shift the normally closed lock valve 47 to an open condition. Conductor 65 is also in fluid communication with conductor 69 which provides pilot pressure operable to shift normally closed lock valve 46 to an open condition.

Conductor 81 is also in fluid communication with conductor 64 which leads to a flow port of enable valve 35. When enable valve 35 is supplied with pilot pressure and therefore, shifted to the open condition, conductor 64 is in fluid communication with conductor 72. Conductor 72 branches into conductors 74 and 73 providing fluid pressure to pressure regulators 50 and 51.

In its normal position, fluid communication is provided through enable solenoid valve 36 between conductor 65 and conductor 79. Conductor 79 is in fluid communication with conductor 83 and therethrough, with reservoir 14. Therefore, the pilot pressure supplied to enable valve 35, lock valve 47 and lock valve 46 is normally exhausted to reservoir 14 and therefore, is essentially zero.

In general, pressure regulators 50 and 51 comprise spring offset variably solenoid actuated infinitely positionable three-way valves with internal pressure feedback. Pressure regulator 50 includes one port which is in fluid communication with conductor 85 which is also in fluid communication with reservoir 14 through conductor 83. Pressure regulator 50 includes another port which is in fluid communication with enable valve 35 through conductors 74 and 72. Pressure regulator 50 includes a third port that is in fluid communication with conductor 76 and therethrough, with lock valve 46.

In its normal deenergized position, pressure regulator 50 permits fluid communication between conductors 76 and 85 and thereby, exhausts lock valve 46 to reservoir 14. When energized by a brake electronic control unit (ECU), (not illustrated) pressure regulator 50 closes the port in communication with conductor 85 and reservoir 14. In response to ECU control, pressure regulator 50 is actuated to provide a set output pressure at conductor 76 through selective communication with conductor 74 as needed.

When pressure regulator 50 is energized, lock valve 46 is thereby supplied by pilot pressure applied through enable solenoid valve 36. Enable solenoid valve 36 is also actuated by an electromechanical solenoid controlled by the ECU. Therefore, the output pressure supplied by pressure regulator 50 is communicated from conductor 76 through lock valve 46 to conductor 77 and is applied to the large piston of intensifier 44. Intensifier 44 operates to apply an increased pressure to conductor 71 and therefore, to wheel brake 40.

Similarly, pressure regulator 51 is in fluid communication with enable valve 35 through conductors 73 and 72 and applies a selected output pressure as determined by the ECU to the conductor 75 through lock valve 47 to conductor 78 and the large piston of intensifier 45. Intensifier 45 applies an increased hydraulic pressure to conductor 70 and therefore, to wheel brake 41 independent of wheel brake 40.

Accordingly, depending on the situation present, the braking pressure applied at each wheel brake 40 and wheel brake 41 is independent and individually determined.

When the ECU enables the hydraulic system to apply braking pressure as thus far described, it also energizes normally open isolation solenoid valves 37 and 38 to move to a closed condition. This prevents a backflow of high pressure braking fluid through conductors 62 and 63 to the master cylinder 22. The application of force to brake pedal actuator 20 generates a pressure in chambers 26 and 28 of master cylinder 22 and therefore, in conductors 60 and 61. Conductor 60, through conductor 59 is in fluid communication with accumulator 29. Accumulator 29 comprises a tunable device for providing an acceptable pedal feel to brake pedal actuator 20.

With the master cylinder part of the brake system 10 being isolated by isolation solenoid valves 37 and 38, the pressure increase in conductors 60 and 61 is perceived by pressure sensors 31 and 33 respectively. Pressure sensors 31 and 33 communicate the magnitude of pressure to the ECU which in turn utilizes the information in an appropriate algorithm to determine application of braking forces to wheel brakes 40 and 41 through means of pressure regulators 50 and 51.

In selected default mode operation, brake pedal actuator 20, through master cylinder 22, is effective to apply braking pressure to wheel brakes 40 and 41. Pressure chambers 26 and 28 of master cylinder 22 are supplied with fluid from reservoir 24 and are operable to utilize that fluid to apply pressure through conductors 60 and 61 through the normally opened isolation solenoid valves 37 and 38 to conductors 62 and 63 and either through intensifiers 44 or 45, or directly to conductors 70 and 71, to apply braking pressure to wheel brakes 40 and 41. When the hydraulic braking system is not enabled by the ECU, lock valves 46 and 47 are closed. This inhibits movement of the intensifier pistons in response to the pressure applied by master cylinder 22.

In alternate selected default mode operation, the ECU operates to energize enable solenoid valve 36 thereby supplying pilot pressure to enable valve 35, lock valve 46 and lock valve 47. This enables utilizing the stored pressure in accumulator 15 to assist in braking the vehicle.

Figure 2:
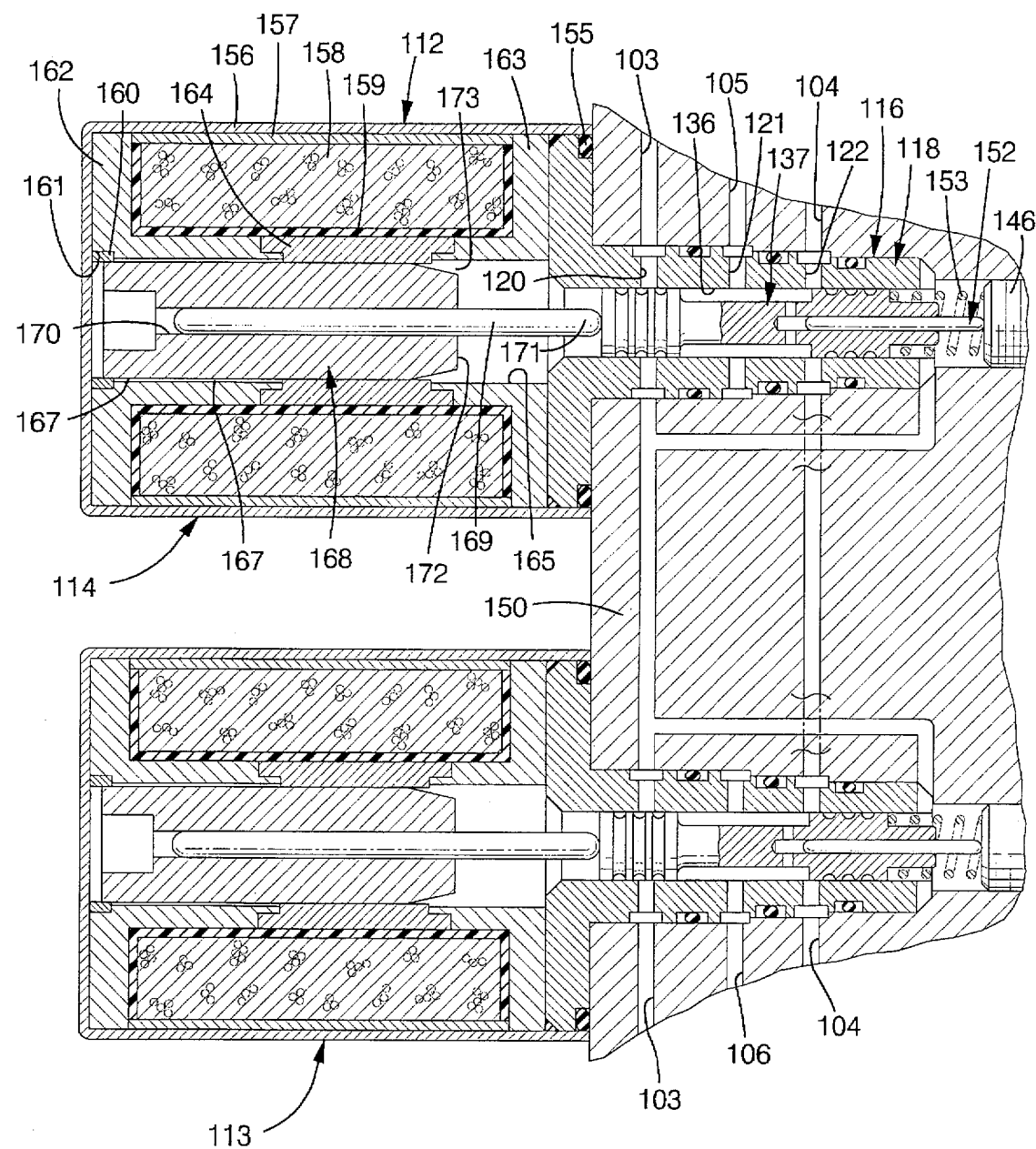
FIG. 2 is a schematic illustration of a dual pressure regulator arrangement for providing independent control to two braking channels.

Referring to FIG. 2, illustrated is a combination of two pressure regulators such as utilized in system 10 for pressure regulators 50 and 51 and applied to a modular unit. A combination of two pressure regulators 112 and 113 are illustrated inserted into module 150. Pressure regulators 112 and 113 are arranged to provide the operational features in a system 10 of FIG. 1.

Module port 103 communicates through module 150 with both pressure regulators 112 and 113. Module port 103 is for providing fluid communication with a fluid reservoir such as reservoir 14 in FIG. 1. Module port 104 communicates through module 150 with both pressure regulators 112 and 113. Module port 104 is for providing fluid communication with a pressurized fluid supply pump such as pump 11 through enable valve 35 in FIG. 1. Module ports 105 and 106 are for providing independently controlled output fluid pressure to individual wheel brakes from the pressure regulators 112 and 113 respectively.

The structure and function of pressure regulators 112 and 113 is essentially identical. Therefore, the following description, though limited to pressure regulator 112 effectively describes both. The valve assembly 116 is illustrated in an enlarged view in FIG. 3.

Figure 3:
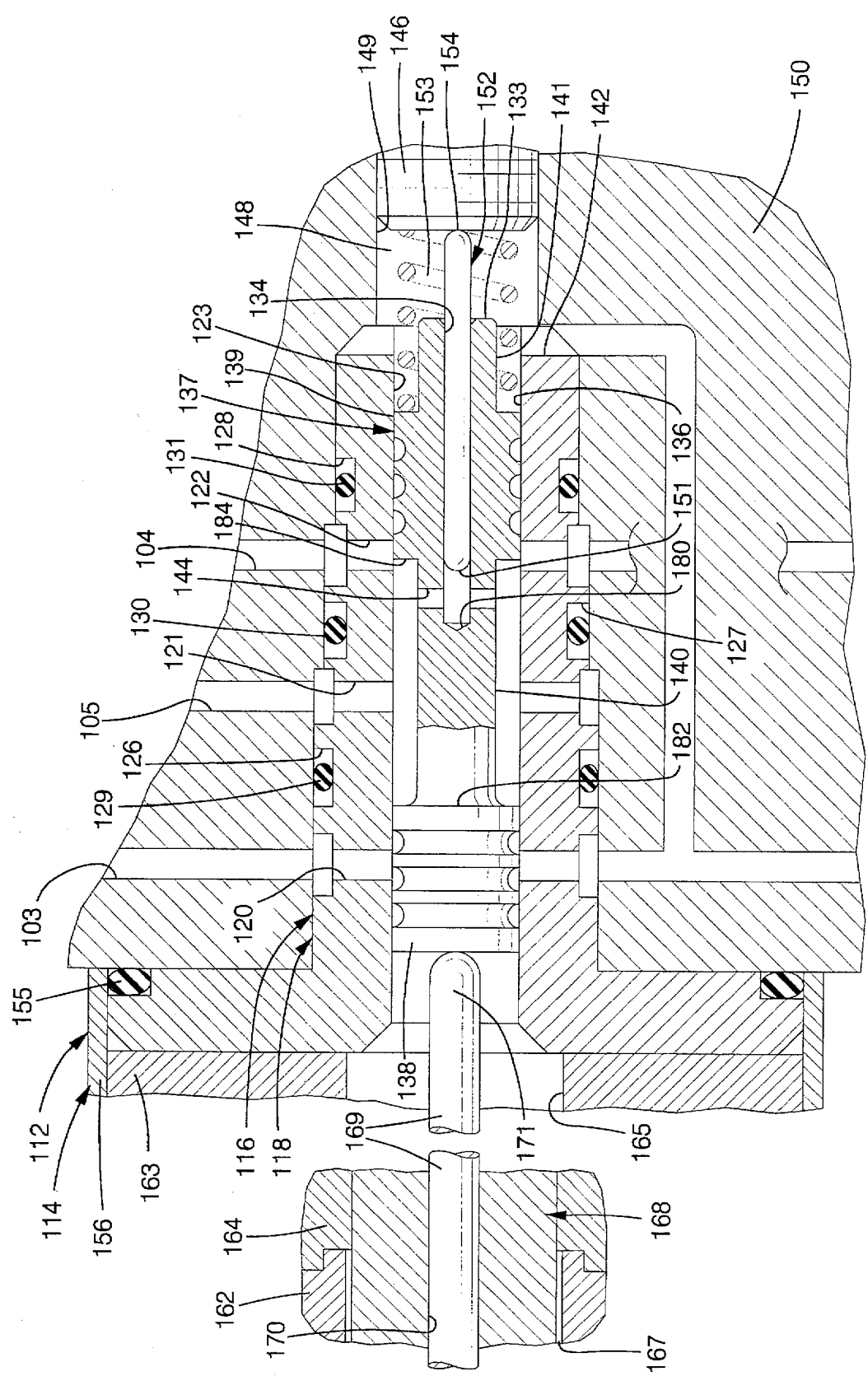
FIG. 3 is an enlarged view of the valve area of FIG. 2.

Referring additionally to FIG. 3, pressure regulator 112 consists of integral actuator assembly 114 and valve assembly 116 which comprise a compact packaged unit. Pressure regulator 112 is configured for installation in a module 150 to provide flow passageways to and from the valve ports 120–122.

Port 122 provides a point for a supply of fluid to enter valve assembly 116. Port 121 provides a point for output flow from valve assembly 116. Port 120 provides a point for exhaust fluid returning to valve assembly 116 through output port 121 to exit the valve assembly 116. Opening 123 provides a point for fluid leakage past the spool to exit valve assembly 116 and return to the system exhaust.

The valve assembly 116 includes housing 118 which is configured with an increasingly larger diameter stepped construction between the series of valve ports. Located between each adjacent pair of valve ports is an annular groove containing an O-ring seal. Annular grooves 126, 127 and 128 contain O-ring seals 129, 130 and 131 to maintain fluid separation between the valve's flow ports when pressure regulator 112 is inserted into a module 150.

Partially extending through opening 123 is the end 133 of a valve spool 137. The end 133 includes bore 134 for carrying a feedback pin 152.

Valve housing 118 includes bore 136 in which spool 137 is slidably contained. Spool 137 includes land 138 and land 139. Between lands 138 and 139, undercut 140 forms an annular groove around the spool 137. Undercut 141 forms a nipple at the end 133 of spool 137 adjacent the land 139. Cross bore 144 extends through valve spool 137 in the area of undercut 140 and intersects with bore 134.

Pressure regulator 112 is fixed in cavity 149 of module 150. Plug 146 is selectively positioned and fixed in cavity 149 for containing valve assembly 116 and forms a chamber 148 adjacent the end 142 of valve assembly 116. Feedback pin 152 is partially disposed in bore 134 and extends from the end 133 of spool 137 through chamber 148 and contacts plug 146. Return spring 153 also bears against plug 146 and extends through chamber 148 and onto spool 137 about undercut 141.

Extending through housing 118 and module 150 are flow passages for supply at supply port 122, output at output port 121 and for exhaust at exhaust port 120 and exhaust opening 123.

Fixed to housing 118 is actuator assembly 114 and an O-ring seal 155 is disposed therebetween. Actuator assembly 114 includes frame 156 which comprises a cylindrical can for housing the actuator. Carried in the frame 156 is a coil 158 which comprises a plurality of turns of wire wound on a bobbin 159. Positioned between coil 158 and frame 156 is sleeve 157.

Rear bearing 160 is fixed in step 161 of secondary plate 162. Rear bearing 160 is ring-shaped and preferably made of brass. Positioned at the opposite end of coil 158 from secondary plate 162 and within frame 156 is primary plate 163. Positioned inside coil 158 between secondary plate 162 and primary plate 163 is sleeve bearing 164 which is preferably made of brass. Primary plate 163, sleeve bearing 164, secondary plate 162 and rear bearing 160 form a cylindrical, axial opening 165 which extends substantially through actuator assembly 114. The axial opening 165 is slightly smaller in diameter at sleeve bearing 164 and rear bearing 160 than it is at secondary plate 162 and primary plate 163. This maintains a slight secondary air gap 167 (shown exaggerated), between armature 168 and plate 162. Rod 169 is fixed in axial opening 170 of armature 168 and includes end 171 that contacts spool 137.

In operation, actuator assembly 114 generates a force proportional to the average current supplied by a controller (the ECU) and applies that force to the hydraulic components of the valve assembly 116. The armature 168 is provided with an included angle of sixteen degrees adjacent end 172. This particular angle for a predetermined length provides actuator assembly 114 with a magnetic force that is only proportional to the current applied to the coil 158 and is independent of the position of the armature 168 in the magnetic circuit for a considerable distance. This feature provides for the ability to use significant positive overlaps between the spool 137 and the supply port 122 and exhaust port 120. The use of positive overlaps provides a means of reducing the leakage pass the spool 137 through the valve assembly 116.

The configuration of sleeve bearing 164 and rear bearing 160 to support the moving armature 168 provides a means of precisely centering the armature 168 with respect to the primary plate 163 and secondary plate 162. The magnetic circuit of actuator assembly 114 comprises coil 158, sleeve 157, primary plate 163, armature 168 and secondary plate 162. Integral in the magnetic circuit is the primary air gap 173 between primary plate 163 and the armature 168 at the included sixteen degree angle and the secondary air gap 167 between secondary plate 162 and armature 168.

The precise centering of armature 168 provided by sleeve bearing 164 and rear bearing 160 permits minimizing the secondary air gap 167 and thereby reducing the reluctance of the magnetic circuit to the flow of the magnetic flux. This enables the generation of a large magnetic force by the actuator assembly 114 through the application of a relatively small magneto-motive force generated by current in the coil 158.

The accurate centering provided by bearings 160 and 164 additionally reduces the total lateral force on the armature 168. The radial forces on armature 168 are of nearly equal magnitude in all radial directions which leads to canceling out of the majority of the lateral force. Therefore, the use of brass bearings to guide the armature 168 without an undesirable amount of drag resulting is made possible. In the present embodiment, adequate centering is provided with a total diametral clearance between sleeve bearing 164 and armature 168 of 0.05 to 0.15 mm. This maintains an operative secondary air gap 167 with a total diametral clearance between secondary plate 162 and armature 168 of 0.30 to 0.40 mm.

The signal used to energize coil 158 is a pulse width modulated (PWM), voltage of low frequency in the neighborhood of 15–35 hertz. The rise in current in coil 158 is dependent on the voltage applied, the time of rise and the electrical self inductance of the magnetic circuit. The dropout of current after the applied signal voltage has been dropped to zero is aided by the use of zener diode.

A zener diode (not illustrated), is connected in the solenoid drive circuit between the drive transistor (not illustrated), and the solenoid coil 158. The zener diode applies a large negative spike of voltage at the time of current dropout on the cessation of a pulse from the driver signal. This results in a rapid decrease in the value of current in the solenoid coil 158, thereby resulting in a rapid drop in the electromagnetic force produced in the armature 168. As the periodic drop in force occurs from the PWM signal, a dynamic imbalance in the forces on the armature 168 results which gives a slight periodic motion to the armature 168. The return of the pressure regulator's moving parts during the periodic movement is also aided by the force of the return spring 153. This movement, also known as dither, effectively reduces the hysteresis which would otherwise arise out of the static drag of the armature 168 against the surfaces of sleeve bearing 164 and rear bearing 160.

The hydraulic components of the valve assembly 116 are designed to regulate the output pressure in the load and to utilize the output pressure in operation. The output pressure which exists about undercut 140 is communicated through cross bore 144 and into bore 134. In bore 134 the output pressure force produced on end 151 of feedback pin 152 is balanced by the reaction of plug 146 against end 154 of feedback pin 152. Of the forces acting on spool 137 the exhaust pressure in chamber 148 is essentially zero. The force of the return spring 153 is relatively very light and therefore is essentially zero. The force of the output pressure works against valve land 138 at annular surface 182, attempting to force spool 137 to the left and also operates against valve land 139 at annular surface 184 attempting to force spool 137 to the right. These forces operate to cancel each other out.

The result is an unbalanced hydraulic force arising from the output pressure that acts upon the area of the spool at the left end 180 of bore 134, which is essentially equal to the cross-sectional area of the feedback pin 152. This unbalance hydraulic force is the feedback force that attempts to return the spool 137 to the closed position.

When the actuator assembly 114 is deenergized the feedback force operates to move spool 137 to cutoff the supply fluid from supply port 122 and cease pressure buildup in the load through the output port 121. When the actuator assembly 114 is energized, the feedback force is opposed and selectively overcome by the electromagnetic force exerted on spool 137 by rod 169.

The electromagnetic portion of pressure regulator 112 generates a force according to the control signal received from the ECU. The spool 137 is displaced toward the supply port 122 to close the normally open flow passage between exhaust port 120 and output port 121 and selectively open a flow passage between supply port 122 and output port 121. This causes a controlled rate of high pressure supply fluid to flow to the load through the output port 121 and module port 105 raising the pressure in the load. The use of feedback pin 152, which is of a reduced cross-sectional area in relation to spool 137, allows actuation of the valve as a servo-controlled device without the penalty of needing to overcome the substantial forces generated at operating pressures of approximately 2000 psi or higher, acting on the total area of spool 137.

The combination of the magnetic configuration and the feedback pressure signal renders the pressure regulator 112 highly repeatable and accurate. The design of the feedback pin 152 results in an inexpensive manufacturing process and a structurally robust arrangement for pressure feedback.

This also eliminates the need to separately route output fluid back to the feedback area. The feedback arrangement enables the valve to respond quickly to changes in an ECU commanded pressure increase by allowing the spool 137 to alternatively completely open the exhaust port 120 or supply port 122 to the output port 121, for a decrease or increase in pressure, respectively.

The limit cycling phenomenon as the spool 137 overcomes the positive overlap with the exhaust and supply ports 120 and 122 is avoided by providing a controlled amount of leakage through the device by the selective use of clearances between spool 137 and housing 118 to provide a smoother transition from a closed to an open condition. A suitable amount of clearance is provided in the present embodiment with a total diametral clearance of 0.02 to 0.038 mm between spool 137 and bore 136.

Figure 4:
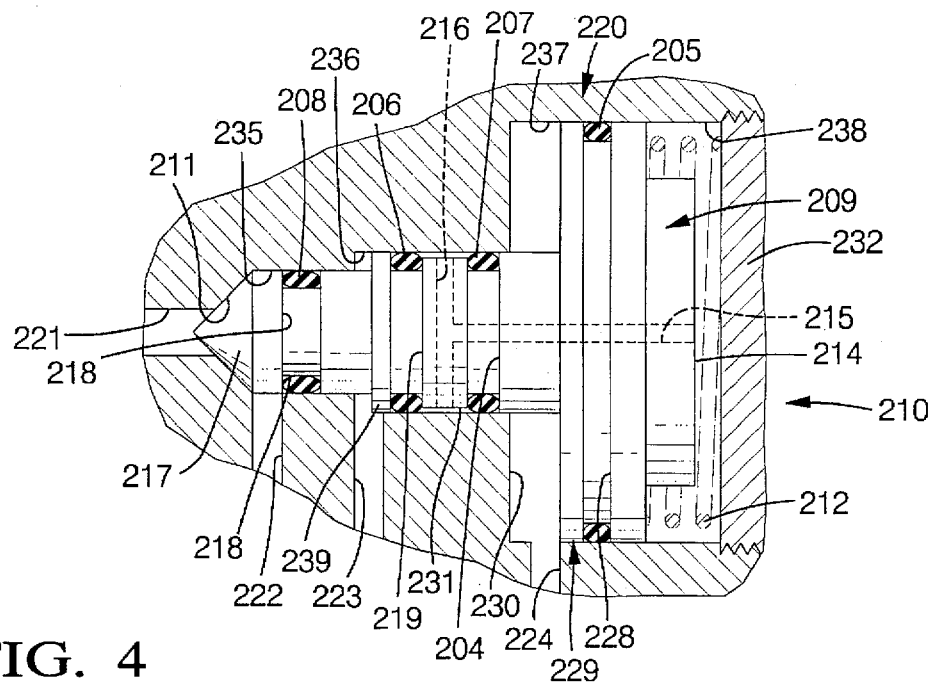
FIG. 4 is a schematic illustration of a pilot operated enable valve.

Referring to FIG. 4, illustrated is an enable valve 210. Module 220 includes bores 237, 236 and 235 which are disposed about a common axis and comprise a successively smaller stepped diameter opening in module 220. The stepped diameter opening 238 is closed by plug 232 which is fixed in module 220. In communication with stepped diameter opening 238 at various locations are port 221, port 222, port 223 and port 224.

Describing enable valve 210 as if inserted for enable valve 35 in system 10 of FIG. 1, port 221 is for communicating with accumulator 15 through conductors 64 and 84. Port 222 is for communicating with pressure regulators 50 and 51 through conductor 72 and conductors 74 and 73 respectively. Port 223 is for communicating with enable solenoid valve 36 through conductors 67 and 65 to alternately supply pressure to valve 210 from pump 11 or return pressurized fluid to reservoir 14. Port 224 is for communication with master cylinder 22 through conductors 58 and 61.

Enable valve 210 has a moving member 209 which includes piston 229, piston 239, stop 214 and poppet 217. Bore 215 extends into moving member 209 through stop 214 to land 231. Cross-bore 216 extends transversely through land 231 and intersects bore 215. This provides means of relieving pressure between stop 214 and plug 232 by internally directing fluid away such as to the reservoir by means (not illustrated), for repositioning moving member 209 to the right.

A groove 218 is formed in moving member 209 between poppet tip 217 and piston 239 and carries O-ring 208 which sealingly mates with module 220 in bore 235. Between piston 239 and land 231 groove 219 is formed in moving member 209 and contains O-ring 206 which sealingly mates with module 220 in bore 236. Between land 231 and piston 229 groove 204 is formed in moving member 209 and contains O-ring 207 which sealingly mates with module 220 in bore 236. Groove 228 is formed about piston 229 of moving member 209 and contains O-ring 205 which sealingly mates with module 220 in bore 237.

Enable valve 210 assumes a normally closed position with poppet 217 sealingly mating with seat 211 to prevent flow between port 221 and port 222. This is accomplished by means of return spring 212 which is disposed about stop 214 and applies a force biasing moving member 209 to the left. When pilot pressure is applied to port 223 from a pump, the fluid pressure operates on piston 239 to compress return spring 212, moving poppet 217 off seat 211 to open fluid communication between ports 221 and 222. Alternately, when fluid pressure is applied to port 224 by a brake master cylinder it is communicating to chamber 230. Pressure in chamber 230 acts upon piston 229 to compress return spring 212, thereby moving poppet 217 off seat 211 and opening fluid communication between ports 221 and 222. The area of piston 229 is substantially larger than the area of piston 239 since the fluid pressure which operates thereon to compress return spring 212 is significantly less as it is supplied by an unboosted master cylinder as opposed to the pressure applied to the piston 239 from the pump. The pilot operated enable valve 10 provides essentially a zero leak valve for conserving system fluid during normal operation. The accumulator charge is maintained to provide limited power braking in the event of selected system default mode operation.

Figure 5:
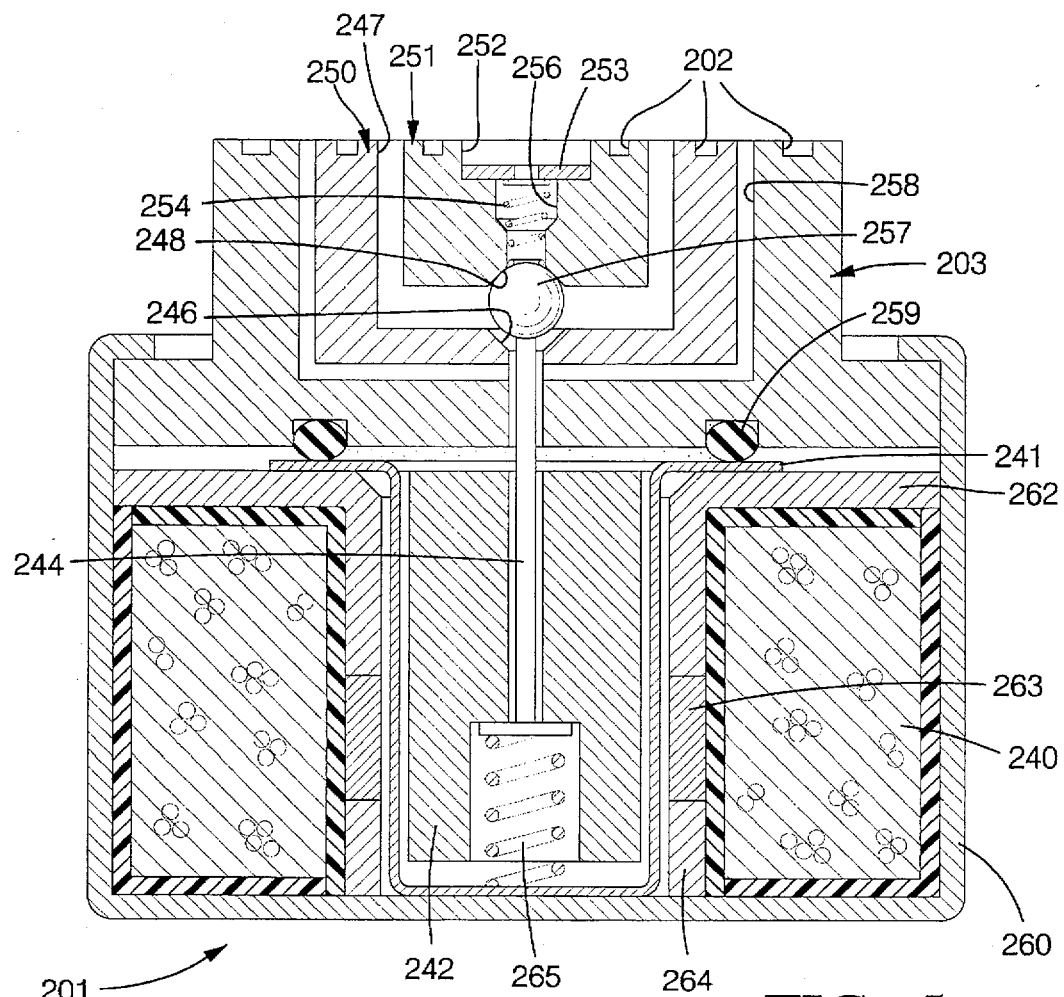
FIG. 5 is a schematic illustration of a three-port enable solenoid valve.

Referring to FIG. 5, an enable solenoid valve 201 is illustrated. Enable solenoid valve 201 is configured for attachment to a module (not illustrated) with O-ring seals (not illustrated) disposed in the grooves 202. Body 203 includes port 247, port 258 and port 252. Describing the valve solenoid valve 201 as if inserted for enable solenoid valve 36 of system 10 in FIG. 1, port 258 is for providing fluid communication between valve 201 and conductor 79 and therefore, with reservoir 14 through conductor 83. Port 247 is for providing fluid communication with conductor 67, thereby communicating with enable valve 35, lock valve 47 and lock valve 46 through conductors 65, 68 and 69 respectively. Port 252 is for providing fluid communication with conductor 81 and therethrough, with pump 11.

Enable solenoid valve 201 includes a solenoid actuator with a coil 240 for generating a magnetic circuit through plate 262, frame 260, plate 264 and armature 242. A spacer 263 is carried between plates 262 and 264. Armature 242 is normally biased toward port 252 by spring 265. Armature 242 is carried in cup 241 which in combination with O-ring seal 259 which seals the high pressure fluid in valve 201.

Body 203 houses inserts 250 and 251 which form valve seats 246 and 248. Carried between valve seats 246 and 248 is ball 257 which alternately mates with seats 246 and 248 to selectively close or open flow paths through the enable solenoid valve 201. Armature 242 carries rod 244 which extends through valve seat 246 and contacts ball 257 and normally moves it to compress the spring 254 seating ball 257 against valve seat 248. Therefore, the device maintains a closed flow path between port 252 and port 247 while concurrently maintaining an open flow path between port 247 and port 258.

Spring 265 is sized such that pump pressure applied through port 252 to ball 247 is not sufficient to compress the spring 265. Therefore, ball 257 is maintained against valve seat 248 until the solenoid is energized. Bore 256 of insert 251 contains a spring 254 which is held in position by insert 253.

When the solenoid portion of enable solenoid valve 201 is energized, the magnetic force moves armature 242 to compress spring 265 which retracts rod 244 through valve seat 246 and by the application of force by spring 254 moves ball 257 off valve seat 248 and upon valve seat 246. This opens the flow path between port 252 and port 247 while concurrently closing the flow path between port 247 and port 258.

Figure 6:
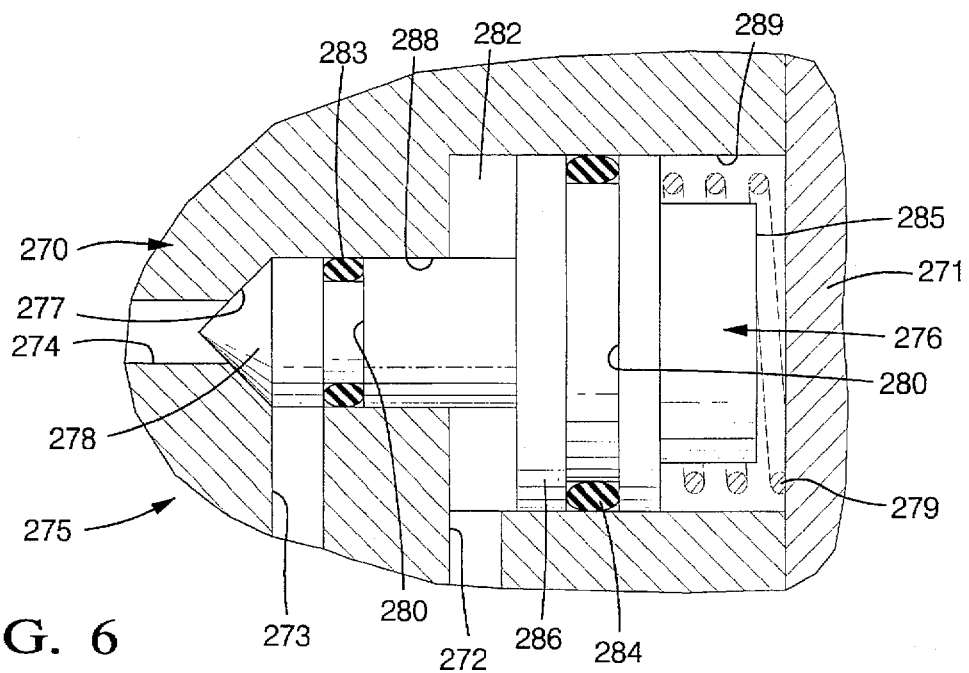
FIG. 6 is a schematic illustration of a pilot operated hydraulic lock valve.

Referring to FIG. 6, a hydraulic lock valve 275 is illustrated. Describing lock valve 275 as if inserted for lock valve 46 of system 10 in FIG. 1, port 274 is provided for communicating with conductor 76 and therethrough, with pressure regulator 50. Port 273 is provided for communication with conductor 77 and therethrough, with intensifier 44. Port 272 is provided for communication with conductor 69 and therethrough, with enable solenoid valve 36 to supply pilot pressure to lock valve 275 through conductor 65.

Lock valve 275 is illustrated in module 270 wherein bores 289 and 288 are formed along a common axis in an stepped diameter arrangement. Ports 273 and 274 communicate with bore 288. Port 272 communicates with bore 289. Carried within bores 288 and 289 is moving member 276. Moving member 276 generally comprises piston 286, stop 285 and poppet 278. Formed in poppet 278 is groove 281 which carries O-ring seal 283 that sealingly mates with module 270 in bore 288. Formed about piston 286 is groove 280 which carries O-ring 284 that sealingly mates with module 270 in bore 289. Bore 289 is closed by plate 271.

Positioned about stop 285 and mating with plate 271 is spring 279 which biases moving member 276 such that poppet 278 is normally positioned against seat 277 to prevent fluid communication between ports 273 and 274. When fluid pressure, such as pilot pressure from enable solenoid valve 36 is applied to port 272 and therefore, communicated to chamber 282, the fluid pressure in chamber 282 acts upon piston 286 and causes moving member 276 to compress spring 279. This repositions poppet 278 off seat 277 and opens a flow path between port 273 and port 274. In its normally closed position, valve 275 maintains the pressure in port 273 by preventing flow to port 274 and thereby hydraulically locks intensifier 44 in position.

Figure 7:
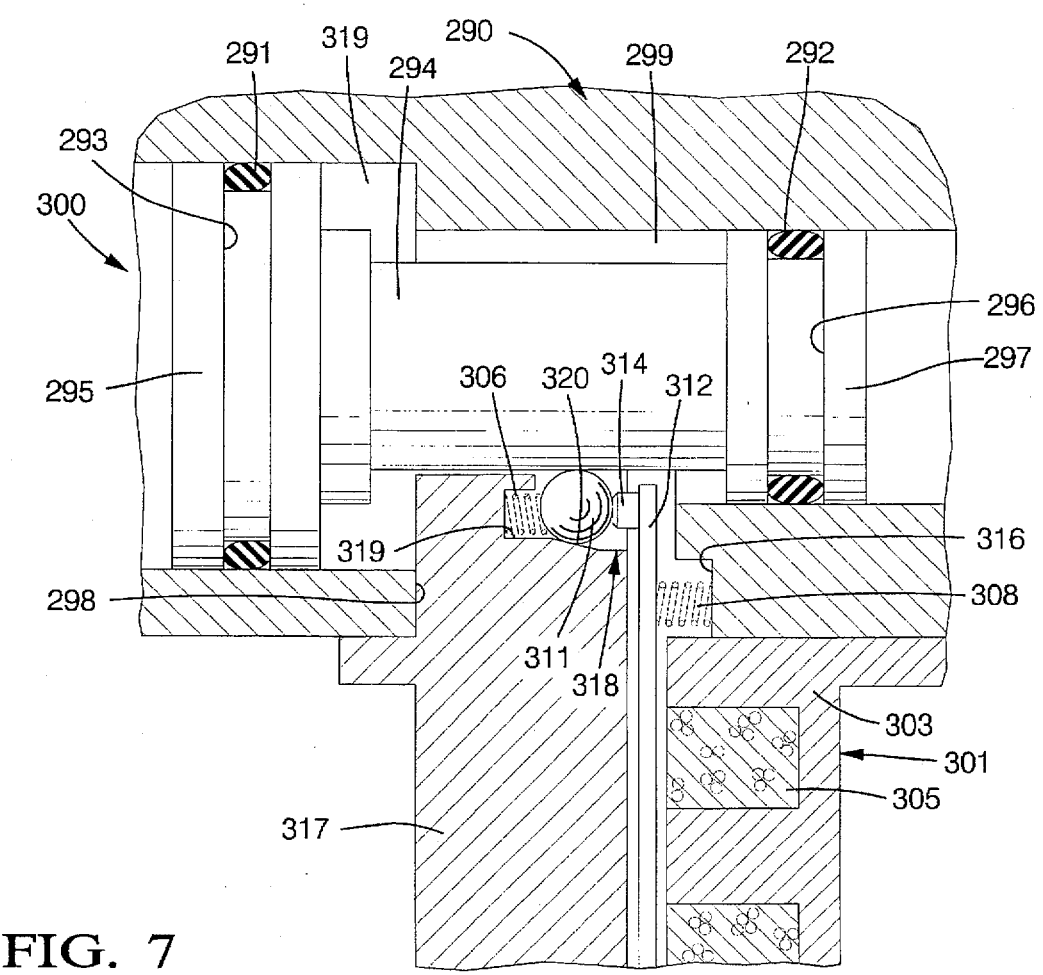
FIG. 7 is a schematic illustration of a mechanical intensifier locking device.

Referring to FIG. 7, an alternate mechanical locking device is illustrated for preventing movement of the intensifiers 44 and 45. Illustrated is an intensifier 300 which generally includes piston 297 and piston 295 connected by rod 294. Piston 297 includes groove 296 which carries O-ring 292 which sealingly mates against module 290 in chamber 299. Piston 295 includes groove 293 which carries O-ring 291 that sealingly mates against module 290 in chamber 319.

Piston 295 includes a substantially larger area than piston 297 and therefore, pressure applied to piston 295 is intensified to a significantly greater pressure by piston 297.

Clutch 318 including roller 311, provides a means for mechanically locking the intensifier 300 by securing rod 294 in position. Lock assembly 301 includes coil 305 which generates an electromagnetic force between pole piece 303 and armature 312 such that when energized, armature 312 moves toward pole piece 303 to compress apply spring 308 while return spring 306 moves roller 311 down ramp 320 to maintain contact with finger 314. Apply spring 308 is carried between wall 316 of module 290 and armature 312. An opening 298 through module 290 permits lock assembly 301 to engage intensifier 300 in chamber 299. Return spring 306 is captured between roller 311 and element 317 in cavity 319.

When coil 305 is deenergized, apply spring 308 forces roller 311 up ramp 320 compressing return spring 306 and applying a transverse force to rod 294 and thereby locking it in position. Therefore, during selected brake system default mode operation, lock assembly 301 moves to lock intensifier 300.

When using a mechanical locking device for the intensifiers 44 and 45 of brake system 10 as shown in FIG. 1, lock valves 46 and 47 are eliminated. Therefore, even during loss of operation of pump 11, an application of force to brake pedal actuator 20 creates a pressure in conductor 61 and therefore, in conductor 58 which shifts enable valve 35 to an open position. The pressure contained in accumulator 15 is permitted to apply reserve power assisted braking force to wheel brakes 40 and 41.

Referring again to FIG. 1, during normal operation when the vehicle driver does not command any braking function the normally closed enable solenoid valve 36 is deenergized which allows the pilot stage of the enable valve 35, the lock valve 46, and the lock valve 47 to be exhausted to the reservoir 14. This allows all three valves to close and securely block all flow. Therefore, the pressurized fluid in accumulator 15 is blocked by the enable valve 35 and the low pressure side of each intensifier 44 and 45 is blocked by its lock valve. When the driver is not commanding any braking at brake pedal actuator 20, the pressure in the master cylinder 22 and at each wheel brake 40 and 41 is essentially zero and no braking will occur.

During normal braking operation when the driver applies a force to the brake pedal actuator 20 the enable solenoid valve 36, the isolation solenoid valve 37, and the isolation solenoid valve 38 are energized. The isolation solenoid valves 37 and 38 isolate the master cylinder 22 from each wheel brake 40 and 41 and provide a sealed hydrostatic system between each intensifier 44 and 45 and its corresponding wheel brake.

The enable solenoid valve 36 provides pressurized fluid to the pilot stage of the enable valve 35, the lock valve 46, and the lock valve 47 which opens all three valves. Pressurized fluid from the hydraulic pump 11 (or the accumulator 15 in selected default mode operation), flows through the open enable valve and supplies each pressure control solenoid valve 50 and 51. The pressure transducers 31 and 33 sense the pressure from the master cylinder 22 which is created by the force the driver has applied to the brake pedal actuator 20. The ECU converts this master cylinder pressure signal into an output current for each pressure control solenoid valve 50 and 51 which provide a proportional output pressure to the low pressure side of each intensifier 44 and 45 which creates a force on each intensifier. The force applied to each intensifier compresses trapped fluid in the system on the high pressure side and creates a pressure at the wheel cylinders 40 and 41 which provides power braking.

The preceding paragraph describes the system response during normal power braking. This system also provides anti-lock braking capability for the vehicle when sensors (not illustrated) and an appropriate ECU algorithm are added to the system as conventionally known in the art.

When the driver commands normal power braking and a wheel speed sensor detects that the wheel is approaching a locked condition, the ECU adjusts the electrical signal to the necessary pressure control solenoid valve 50 and/or 51, to selectively decrease the output pressure applied to the related intensifier, which decreases the wheel brake pressure, controllably reducing wheel rotation. The ECU continues to use the pressure control solenoids 50 and 51 to modulate the pressure at the wheel brakes 40 and 41 to prevent wheel lock up to stop the vehicle.

Traction control is also provided by this system when wheel sensors (not illustrated) and an appropriate ECU algorithm as conventionally known in the art are added to the system. The ECU automatically enables the brake system 10 when the wheel speed sensor detects an incipient wheel slip condition. When the brake system 10 is enabled, the enable solenoid 36, the isolation solenoid valve 37, and the isolation solenoid valve 38 are energized. The isolation solenoid valves 37 and 38 isolate the master cylinder 22 from each wheel brake 40 and 41. This provides a sealed hydrostatic system between each intensifier 44 and 45 and its corresponding wheel brake 40 and 41. The enable solenoid 36 provides pressurized fluid to the pilot stage of the enable valve 35, the lock valve 46, and the lock valve 47 which opens all three valves. Pressurized fluid from the hydraulic pump 11 flows through the open enable valve 35 and supplies each pressure regulator 50 and 51.

The ECU provides an electrical signal to the appropriate pressure regulator which provides a proportional output pressure to the low pressure side of the related intensifier which creates a force on the intensifier. The force applied to the intensifier compresses the trapped fluid on the high pressure side and creates a selected pressure at the corresponding wheel brake which provides automatic braking for the spinning wheel. The ECU continues to use the appropriate pressure regulator to modulate the pressure to the required wheel to limit spin and to improve traction for the vehicle.

When the brake system 10 is enabled, the enable solenoid 36, the isolation solenoid valve 37, and the isolation solenoid valve 38 are all energized. Therefore, an alternative embodiment to the brake system 10, replaces both isolation solenoid valves 37 and 38 with pilot operated check valves similar to the enable valve 35. In combination, the five pilot operated valves are operated by a slightly larger enable solenoid valve. This alternate embodiment results in additional system savings because pilot operated valves are generally less costly than solenoid operated valves. Additionally, the drivers and wiring for the replaced solenoids are not required.

What is claimed is:

1. A braking system comprising:
    a wheel brake;
    a pump;
    a hydraulic network connecting the pump to the wheel brake including an intensifier;
    pressure regulator connected in the hydraulic network between the pump and the intensifier;
    an enable valve being normally closed and connected in the hydraulic network between the pump and the pressure regulator;
    and a means for actuating the enable valve wherein the means for actuating the enable valve includes a three way normally closed solenoid operated valve.

2. A braking system according to claim 1 further comprising a lock valve connected in the hydraulic network between the pressure regulator and the intensifier and a solenoid operated valve having first, second and third ports with the first port connected to a pilot conductor network, the pilot conductor network being interconnected with the enable valve and the lock valve.

3. A braking system according to claim 2 further comprising a master cylinder and a master cylinder conductor network including a normally open valve connected between the master cylinder and the wheel brake.

4. A braking system according to claim 3 wherein the master cylinder conductor network includes a pilot line connected to the enable valve.

5. A braking system comprising:
    a wheel brake;
    a pump operable to generate a fluid pressure in the braking system;
    a pressure regulator regulating the fluid pressure;
    an enable valve being normally closed and connected in the braking system between the pump and the pressure regulator;
    an intensifier connected in the braking system between the pressure regulator and the wheel brake; and means for locking the intensifier wherein the means for locking the intensifier include a lock valve that is pilot operated wherein the enable valve is pilot operated and further comprising a three-way solenoid operated valve connected to the enable valve and the lock valve operable to effect pilot operation of the enable valve and the lock valve.

6. A braking system according to claim 5 wherein the enable valve includes a first, a second and a third port with a flow path extending between the first and second ports through a valve seat with a poppet operable to securely close the flow path at the valve seat and a piston connected to the poppet and disposed in a chamber, the chamber being in fluid communication with the third port.

7. A braking system according to claim 5 wherein the three-way solenoid operated valve includes a first port, a second port and a third port with a first flow path extending between the first port and the second port through a first valve seat and a second flow path extending between the second port and the third port through a second valve seat, an obturator disposed between the first valve seat and the second valve seat and a solenoid actuator normally biasing the obturator against the first valve seat closing the first flow path, the solenoid actuator operable to release the obturator from the first valve seat wherein a spring biases the obturator against the second valve seat.

8. A braking system having two independent channels providing independent braking control for first and second wheel brakes comprising:

a pump;

a reservoir;

a normally closed three port enable solenoid valve communicating with the pump and the reservoir;

a first pressure regulator disposed in the braking system between the pump and the first wheel brake;

a second pressure regulator disposed in the braking system between the pump and the second wheel brake;

a pilot operated enable valve disposed in the braking system between the pump and both the first and second pressure regulators responsive to the normally closed three-port enable solenoid valve;

a first intensifier disposed in the braking system between the first pressure regulator and the first wheel brake;

a second intensifier disposed in the braking system between the second pressure regulator and the second wheel brake; and means for locking the first and second intensifiers.

9. A braking system according to claim 8 further comprising a master cylinder, wherein the pilot operated enable valve is responsive to both the normally closed three-port enable solenoid and the master cylinder.

10. A braking system according to claim 8 further comprising a master cylinder communicating with the first and second wheel brakes operable to generate a fluid pressure, a controller and a pressure sensor operable to communicate the magnitude of the fluid pressure to the controller wherein the pressure regulator is responsive to the controller.

11. A braking system according to claim 10 wherein the normally closed three-port enable solenoid valve is responsive to the controller.

12. A braking system according to claim 11 wherein the means for locking the first and second intensifiers is responsive to the normally closed three-port enable solenoid valve.

13. A braking system according to claim 11 wherein the means for locking the first and second intensifiers is responsive to the controller.

14. A braking system according to claim 11 further comprising a normally open isolation valve disposed in the braking system between the master cylinder and the first wheel brake.

* * * * *